(12) United States Patent
Park et al.

(10) Patent No.: US 10,788,922 B2
(45) Date of Patent: Sep. 29, 2020

(54) FINGERPRINT/TOUCH SENSOR AND ELECTRONIC APPARATUS INCLUDING THE SAME

(71) Applicant: SAMSUNG ELECTRONICS CO., LTD., Suwon-si (KR)

(72) Inventors: Jaechul Park, Yangju-si (KR); Jinmyoung Kim, Hwaseong-si (KR); Byungkyu Lee, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 123 days.

(21) Appl. No.: 16/046,160

(22) Filed: Jul. 26, 2018

(65) Prior Publication Data
US 2019/0034024 A1    Jan. 31, 2019

(30) Foreign Application Priority Data
Jul. 26, 2017    (KR) .......................... 10-2017-0094975

(51) Int. Cl.
*G06F 3/041* (2006.01)
*G06K 9/00* (2006.01)
*G06F 3/044* (2006.01)

(52) U.S. Cl.
CPC ............ *G06F 3/0416* (2013.01); *G06F 3/044* (2013.01); *G06K 9/0002* (2013.01)

(58) Field of Classification Search
None
See application file for complete search history.

(56) References Cited

U.S. PATENT DOCUMENTS

2010/0177085 A1* 7/2010 Yamagishi ............... G09G 3/36
                                                                345/211
2013/0162506 A1* 6/2013 Kim .................... G02F 1/13452
                                                                 345/82

(Continued)

FOREIGN PATENT DOCUMENTS

JP          4292916 B2    7/2009
KR      10-0325381 B1    3/2002
(Continued)

*Primary Examiner* — Patrick N Edouard
*Assistant Examiner* — Peijie Shen
(74) *Attorney, Agent, or Firm* — Sughrue Mion, PLLC

(57) ABSTRACT

Provided are fingerprint/touch sensors and electronic devices including the same. A fingerprint/touch sensor includes: a touch pad; a touch sensing element including a plurality of first touch sensing lines extending in a row direction and a plurality of second touch sensing lines extending in a column direction, different from the row direction, and intersecting the first touch sensing lines, the touch sensing element forming a touch region on the touch pad; a fingerprint sensing element including a plurality of first fingerprint sensing lines extending in the row direction and a plurality of second fingerprint sensing lines extending in the column direction and intersecting the first fingerprint sensing lines, the fingerprint sensing element forming a fingerprint sensing region on the touch pad; a routing unit configured to route signals generated from the touch sensing element and the fingerprint sensing element; and an integrated circuit configured to sense a touch or a fingerprint by processing the signals transmitted from the routing unit.

15 Claims, 6 Drawing Sheets

(56) References Cited

U.S. PATENT DOCUMENTS

| | | | | |
|---|---|---|---|---|
| 2016/0014880 A1* | 1/2016 | Lee | ............ | H05K 5/02 |
| | | | | 361/752 |
| 2016/0231838 A1* | 8/2016 | Wang | ............ | G06F 3/044 |
| 2016/0232395 A1* | 8/2016 | Han | ............ | G06F 1/1684 |
| 2017/0083273 A1* | 3/2017 | Kim | ............ | G09G 3/3406 |
| 2017/0090593 A1 | 3/2017 | Cao et al. | | |
| 2017/0193265 A1* | 7/2017 | Chan | ............ | G06K 9/0002 |
| 2017/0285846 A1* | 10/2017 | Mizuhashi | ............ | G06F 3/044 |
| 2017/0336906 A1 | 11/2017 | Yoon et al. | | |
| 2017/0344787 A1* | 11/2017 | Cho | ............ | G06K 9/00013 |
| 2018/0114047 A1* | 4/2018 | Kim | ............ | G06K 9/00026 |
| 2018/0203540 A1* | 7/2018 | Maguire | ............ | G06F 3/0416 |
| 2018/0300529 A1* | 10/2018 | Zuo | ............ | G06K 9/00013 |
| 2018/0335880 A1* | 11/2018 | Seol | ............ | G06F 3/044 |

FOREIGN PATENT DOCUMENTS

| | | |
|---|---|---|
| KR | 10-2016-0033328 A | 3/2016 |
| KR | 10-2017-0129476 A | 11/2017 |

* cited by examiner

FINGERPRINT/TOUCH SENSOR AND ELECTRONIC APPARATUS INCLUDING THE SAME

CROSS-REFERENCE TO RELATED APPLICATION

This application claims priority from Korean Patent Application No. 10-2017-0094975, filed on Jul. 26, 2017, in the Korean Intellectual Property Office, the disclosure of which is incorporated herein in its entirety by reference.

BACKGROUND

1. Field

Apparatuses consistent with exemplary embodiments relate to fingerprint/touch sensors and electronic apparatuses including the same, and more particularly, to fingerprint/touch sensors configured to perform both fingerprint sensing and touch sensing by including a shared fingerprint sensing region and touch sensing region on a touch panel, and electronic apparatuses including the fingerprint/touch sensors.

2. Description of the Related Art

The desire for personal authentication using unique personal characteristics such as fingerprints, voices, faces, hands, and irises has gradually increased. Personal authentication is often used for banking equipment, entry/exit controls, mobile devices, and notebooks. Recently, mobile devices such as smart phones have become more widespread, and accordingly, fingerprint sensing devices for personal authentication have been employed in smart phones to protect the large amount of information stored in the smart phones. There are various methods for implementing a fingerprint sensing device, for example, an optical method, a thermal sensing method, and an electrostatic capacitance method. Of these methods, according to the electrostatic capacitance method, a fingerprint pattern is sensed by detecting a change of electrostatic capacitance according to a shape of valleys and ridges of a fingerprint when a surface of a person's finger touches a conductive detection pattern.

Fingerprint sensing devices of the related art are implemented as separate constituent elements from a touch sensing unit, and thus, an additional space is needed. Therefore, there are problems in that the development and manufacturing of a fingerprint sensing device requires additional costs and efforts.

SUMMARY

One or more exemplary embodiments provide fingerprint/touch sensors and electronic apparatuses including the same, and more particularly, fingerprint/touch sensors configured to perform both fingerprint sensing and touch sensing by including a shared fingerprint sensing region and touch sensing region on a touch panel, and electronic apparatuses including the fingerprint/touch sensors.

Additional exemplary aspects will be set forth in part in the description which follows and, in part, will be apparent from the description, or may be learned by practice of the presented exemplary embodiments.

According to an aspect of an exemplary embodiment, a fingerprint/touch sensor includes: a touch pad; a touch sensing element, including a plurality of first touch sensing lines extending in a row direction and a plurality of second touch sensing lines extending in a column direction and crossing the first touch sensing lines, wherein the touch sensing element forms a touch region on the touch pad; a fingerprint sensing element including a plurality of first fingerprint sensing lines extending in the row direction and a plurality of second fingerprint sensing lines extending in the column direction and crossing the first fingerprint sensing lines, wherein the fingerprint sensing element forms a fingerprint sensing region on the touch pad; a routing unit configured to route signals generated from the touch sensing element and the fingerprint sensing element; and an integrated circuit configured to sense a touch by processing the signals transmitted by the touch sensing element from the routing unit and to sense a fingerprint by processing the signals transmitted by the fingerprint sensing element from the routing unit, wherein the fingerprint sensing region overlaps at least a portion of the touch sensing region.

The fingerprint sensing element may be located within the touch region.

The integrated circuit may be a combined-integrated circuit configured to process both fingerprint sensing and touch sensing.

The routing unit may include a plurality of first routing units located at a side of the touch pad, and the first routing units may be configured to route the first touch sensing lines, the second touch sensing lines, the first fingerprint sensing lines, and the first fingerprint sensing lines to the integrated circuit.

The integrated circuit may be a chip on film (COF) located directly on the first routing units.

The fingerprint/touch sensor may further include a printed circuit board (PCB) on which the integrated circuit is located.

A plurality of the fingerprint sensing regions may be located on the fingerprint sensing element and arranged in a matrix.

The routing unit may include a plurality of first routing units and a plurality of second routing units, the first and second routing units being located at a side of the touch pad, wherein the first routing units are configured to route the first touch sensing lines and the first fingerprint sensing lines to the integrated circuit, and the second routing units are configured to route the second touch sensing lines and the second fingerprint sensing lines to the integrated circuit.

The integrated circuit may include a first integrated circuit and a second integrated circuit, wherein the first routing units are configured to route the first touch sensing lines and the first fingerprint sensing lines to the first integrated circuit, and the second routing units are configured to route the second touch sensing lines and the second fingerprint sensing lines to the second integrated circuit.

The first integrated circuit may be a COF located directly on the first routing units, and the second integrated circuit may be a COF located directly on the second routing units.

The fingerprint/touch sensor may further include a PCB on which the integrated circuit is located.

The PCB may include a first PCB on which the first integrated circuit is located and a second PCB on which the second integrated circuit is located.

The first and second integrated circuits may be combined-integrated circuits configured to process both touch sensing and fingerprint sensing.

The fingerprint/touch sensor may further include a switching device connected between the routing unit and the integrated circuit, the switching device configured to switch connections between the routing unit and the integrated circuit.

The fingerprint/touch sensor may further include a switching device connected between the routing unit and the integrated circuit, the switching device configured to switch connections between the routing unit and the integrated circuit.

The fingerprint/touch sensor may further include: a plurality of first switching devices connected between the first routing units and the first integrated circuit, the first switching devices configured to switch connections between the first routing units and the first integrated circuit; and a plurality of second switching devices connected between the second routing units and the second integrated circuit, the second switching devices configured to switch connections between the second routing units and the second integrated circuit.

According to an aspect of another exemplary embodiment, an electronic device includes the fingerprint/touch sensor described above.

BRIEF DESCRIPTION OF THE DRAWINGS

These and/or other exemplary aspects an advantages will become apparent and more readily appreciated from the following description of the embodiments, taken in conjunction with the accompanying drawings in which.

DETAILED DESCRIPTION

Figure 1:
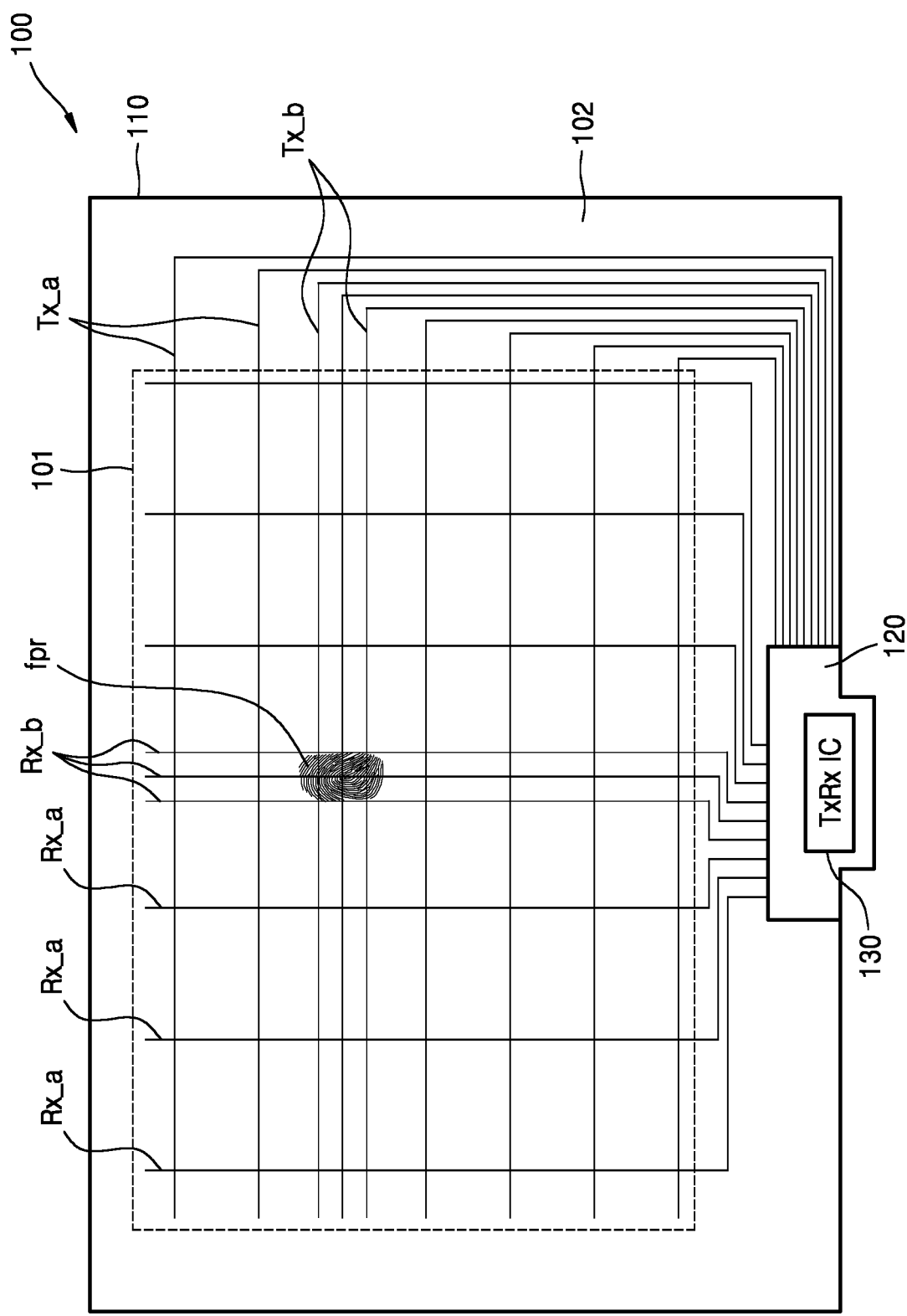
FIG. 1 is a schematic diagram of a fingerprint/touch sensor according to an exemplary embodiment.

Fingerprint/touch sensors according to an exemplary embodiment and electronic apparatuses including the same will now be made in detail with reference to the accompanying drawings. In the drawings, widths and thicknesses of layers or regions may be exaggerated for clarity and convenience of explanation. Also, like reference numerals refer to like elements throughout.

Terminologies used herein are selected as commonly used by those of ordinary skill in the art in consideration of functions of the current embodiment, but may vary according to the technical intention, precedents, or a disclosure of a new technology. Also, in particular cases, some terms are arbitrarily selected by the applicant, and in this case, the meanings of the terms will be described in detail at corresponding parts of the specification. Accordingly, the terms used in the specification should be defined not by simply the names of the terms but based on the meaning and contents of the whole specification.

It will be understood that, although the terms "first", "second", etc. may be used herein to describe various elements, these elements should not be limited by these terms. These terms are only used to distinguish one element from another.

As used herein, the singular forms are intended to include the plural forms as well, unless the context clearly indicates otherwise. Also, when a part "comprises" or "includes" an element in the specification, unless otherwise defined, other elements are not excluded from the part and the part may further include other elements.

FIG. 1 is a schematic diagram of a fingerprint/touch sensor 100 according to an exemplary embodiment. Referring to FIG. 1, the fingerprint/touch sensor 100 may include a touch pad 110, a plurality of first touch sensing lines Tx_a, a plurality of second touch sensing lines Rx_a, a plurality of first fingerprint sensing lines Tx_b, a plurality of second fingerprint sensing lines Rx_b, a routing unit 120, and an integrated circuit 130.

The touch pad 110 includes a touch region 101 and a non-touch region 102. The touch region 101 may include a touch sensing unit and a fingerprint sensing unit. The touch sensing unit may include the first touch sensing lines Tx_a and the second touch sensing lines Rx_a. The fingerprint sensing unit may include the first fingerprint sensing lines Tx_b and the second fingerprint sensing lines Rx_b. The non-touch region 102 refers to a region of the touch pad 110 outside of the touch region 101. For example, the routing unit 120 and the integrated circuit 130 may be arranged in the non-touch region 102. The routing unit 120 may transmit signals to the integrated circuit 130 after routing the signals sensed by the touch sensing unit and the fingerprint sensing unit. The integrated circuit 130 may process a signal sensed by the touch sensing unit and a fingerprint sensing unit, or may apply a driving signal to the touch sensing unit and a fingerprint sensing unit.

The fingerprint/touch sensor 100 according to an exemplary embodiment may be a fingerprint sensor which detects a fingerprint using an electrostatic capacitance method. The first touch sensing lines Tx_a and the first fingerprint sensing lines Tx_b may be Tx electrodes. The second touch sensing lines Rx_a and the second fingerprint sensing lines Rx_b may be Rx electrodes. Capacitors (not shown) for measuring electrostatic capacitances may be formed on crossing points of the first touch sensing lines Tx_a and the second touch sensing lines Rx_a. Capacitors (not shown) for measuring electrostatic capacitances may be formed on crossing points of the first fingerprint sensing lines Tx_b and the second fingerprint sensing lines Rx_b. Driving units (not shown) of the Tx electrodes and the Rx electrodes may be arranged separate from the touch region 101. For example, the driving units (not shown) of the Tx electrodes and the Rx electrodes may be included in the integrated circuit 130, but the present exemplary embodiment is not limited thereto.

Since the touch sensing unit does not require as high of a resolution as the fingerprint sensing unit, the first touch sensing lines Tx_a and the second touch sensing lines Rx_a may be separated by an appropriate distance. For example, in order for an entire region of the touch pad 110 to be capable of touch sensing, the entire region of the touch pad 110 may be configured of 21 first touch sensing lines Tx_a and 17 second touch sensing lines Rx_a. For example, a distance separating the first touch sensing lines Tx_a may be greater than that separating the first fingerprint sensing lines Tx_b. For example, a distance separating the second touch sensing lines Rx_a may be greater than that separating the second fingerprint sensing lines Rx_b.

The first fingerprint sensing lines Tx_b and the second fingerprint sensing lines Rx_b utilize a comparatively larger number of lines than touch sensing lines wc: Tx_a, Tx_b. This is because a fingerprint sensing is possible when a plurality of fingerprint sensing lines are located between ridges and valleys of a fingerprint. For example, in order to form a single fingerprint sensing region fpr on the touch pad 110, the fingerprint sensing region pfr may be configured of 64 first fingerprint sensing lines Tx_b and 128 second fingerprint sensing lines Rx_b. For example, when the touch pad 110 is configured to be capable of sensing a finger print on an entire region of the touch region 101, a plurality of the fingerprint sensing regions pfr may be arranged in a matrix type arrangement. For example, when the fingerprint sensing regions pfr are arranged in a 9×11 matrix, the first fingerprint sensing regions pfr may be configured of 574 first fingerprint sensing lines Tx_b and 1408 second fingerprint sensing lines Rx_b.

The routing unit 120 makes routings between the touch sensing unit and the fingerprint sensing unit and the integrated circuit 130. The routing unit 120 may include routing wires connected to the first touch sensing lines Tx_a, the second touch sensing lines Rx_a, the first fingerprint sensing lines Tx_b, and the second fingerprint sensing lines Rx_b and a routing terminal for connecting the routing wires to the integrated circuit 130. There are two types of routing terminals, that is, a chip on film (COF) type in which an integrated circuit is arranged directly on a terminal and a printed circuit board (PCB) type in which an integrated circuit is arranged on a separate PCB and a routing terminal as a flexible PCB (FPCB) type is connected to the PCB.

The integrated circuit 130 may sense a touch or a fingerprint by processing a signal transmitted from the touch sensing unit and the fingerprint sensing unit. The integrated circuit 130 may include a driving unit and a sensing unit, formed as one-body, for measuring a mutual capacitance, but the present exemplary embodiment is not limited thereto. For example, the integrated circuit 130 may include driving units (not shown) configured to apply driving signals to each of the first touch sensing lines Tx_a, the second touch sensing lines Rx_a, the first fingerprint sensing lines Tx_b, and the second fingerprint sensing lines Rx_b and a mutual capacitance sensor (not shown) for measuring a mutual capacitance. The integrated circuit 130 may be a combined integrated circuit configured to control all of the first touch sensing lines Tx_a and the first fingerprint sensing lines Tx_b that extend in a first direction and the second touch sensing lines Rx_a and the second fingerprint sensing lines Rx_b that extend in a second direction. Since the control of the touch sensing unit and the fingerprint sensing unit is performed together by the combined integrated circuit, the number of the integrated circuits 130 required by the fingerprint/touch sensor 100 may be reduced.

Referring to FIG. 1, the fingerprint sensing unit may form the fingerprint sensing region pfr arranged on an arbitrary region of the touch region 101. For example, the fingerprint sensing region pfr may be arranged on a central region of the touch region 101. Since the fingerprint sensing region pfr and the touch sensing region overlap and are not physically separate from each other, a fingerprint/touch sensor 100 having a good appearance may be realized.

Referring to FIG. 1, the routing unit 120 according to the present exemplary embodiment may be a COF type in which the integrated circuit 130 is directly arranged on the terminal. Since the integrated circuit 130 is directly arranged on the routing unit 120, the integration rate of the device with respect to area may be increased. The routing unit 120 may be arranged on a side of the touch pad 110. The routing wires arranged on the non-touch region 102 may be connected to the routing terminal by being connected to the first touch sensing lines Tx_a, the second touch sensing lines Rx_a, the first fingerprint sensing lines Tx_b, and the second fingerprint sensing lines Rx_b.

Figure 2:
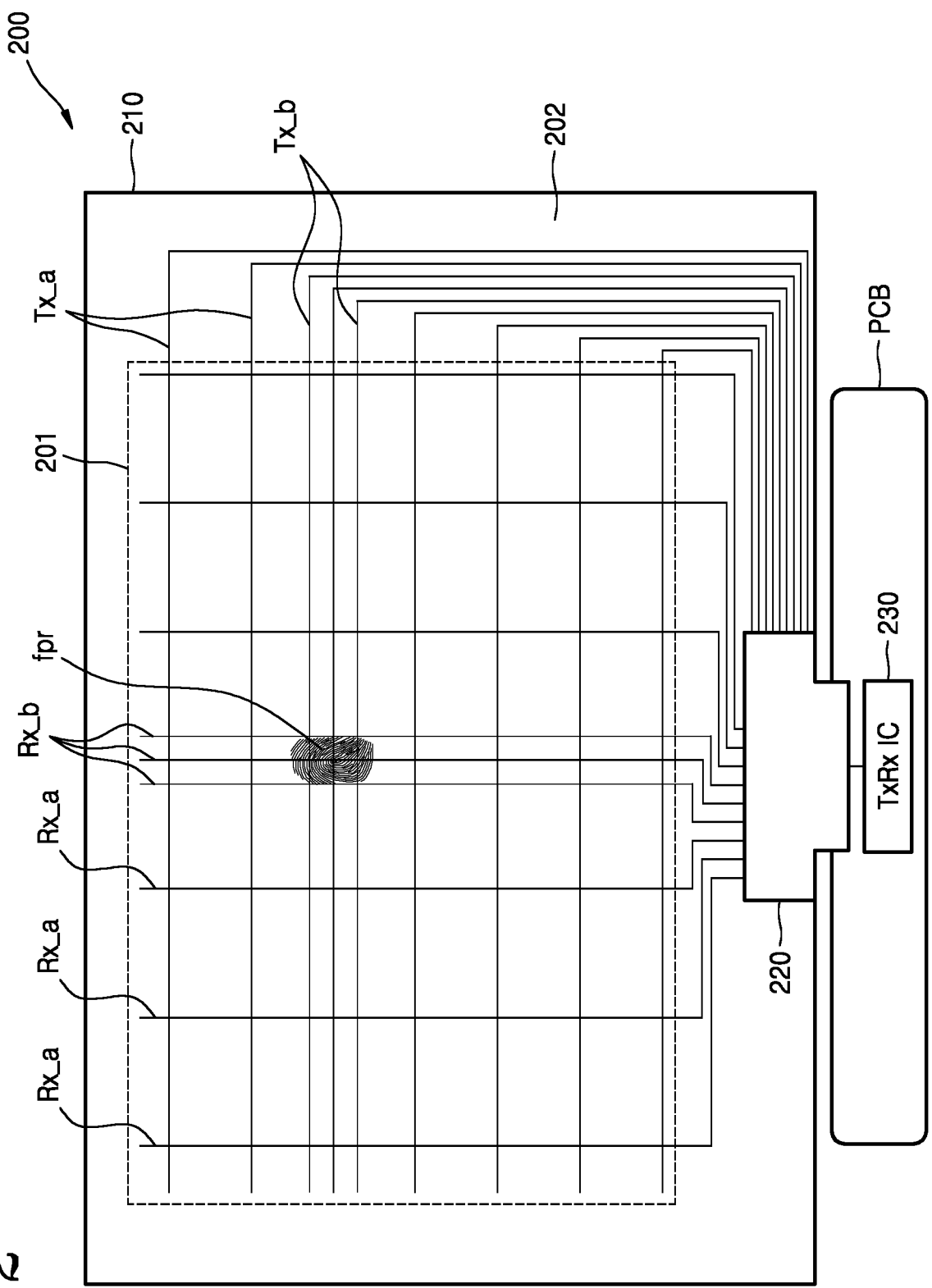
FIG. 2 is a schematic diagram of a fingerprint/touch sensor according to another exemplary embodiment.

FIG. 2 is a schematic diagram of a fingerprint/touch sensor 200 according to another exemplary embodiment. Referring to FIG. 2, the fingerprint/touch sensor 200 includes a touch pad 210, a plurality of first touch sensing lines Tx_a, a plurality of second touch sensing lines Rx_a, a plurality of first fingerprint sensing lines Tx_b, a plurality of second fingerprint sensing lines Rx_b, a routing unit 220, an integrated circuit 230, and a PCB substrate PCB. A touch sensing unit and a fingerprint sensing unit arranged on a touch region 201 are substantially identical to the touch sensing unit and the fingerprint sensing unit described with reference to FIG. 1, and thus, the descriptions thereof will not be repeated.

In the fingerprint/touch sensor 200 according to the present exemplary embodiment, the integrated circuit 230 may not be directly arranged on the routing unit 220 but may be arranged on the separate PCB circuit PCB. It is depicted that the PCB circuit PCB is separate from the touch pad 210, but the present exemplary embodiment is not limited thereto. That is, the PCB circuit PCB may be arranged to contact the touch pad 210. The routing unit 220 may include a FPCB.

Figure 3:
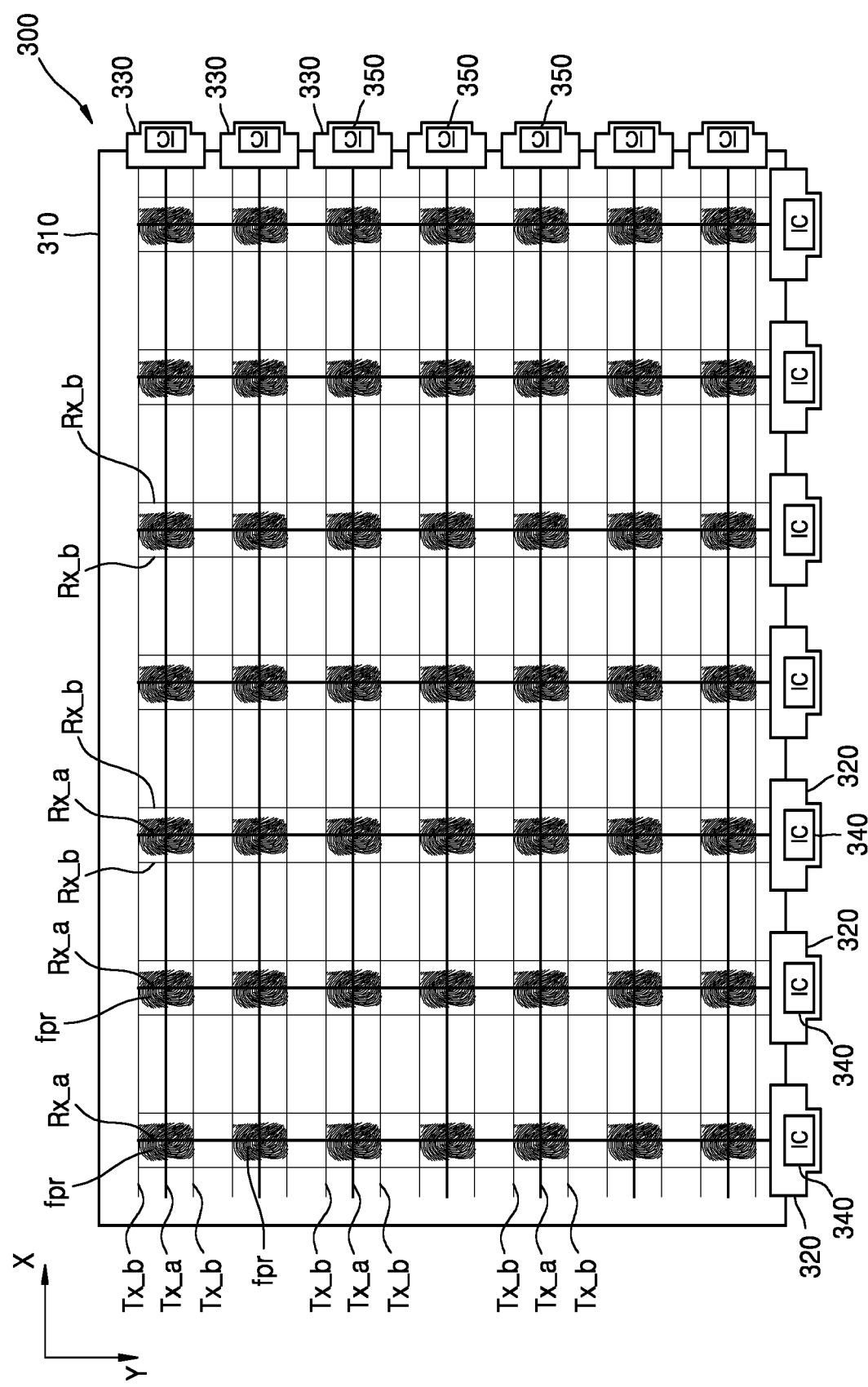
FIG. 3 is a schematic diagram of a fingerprint/touch sensor according to another exemplary embodiment.

FIG. 3 is a schematic diagram of a fingerprint/touch sensor 300 according to another exemplary embodiment. Referring to FIG. 3, the fingerprint/touch sensor 300 includes a touch pad 310, a plurality of first touch sensing lines Tx_a, a plurality of second touch sensing lines Rx_a, a plurality of first fingerprint sensing lines Tx_b, a plurality of second fingerprint sensing lines Rx_b, a plurality of first routing units 330, a plurality of second routing units 320, a plurality of first integrated circuits 350, and a plurality of second integrated circuits 340.

In the fingerprint/touch sensor 300 according to the present exemplary embodiment, fingerprint sensing regions pfr may be arranged in a matrix type. The second touch sensing lines Rx_a and the second fingerprint sensing lines Rx_b are collected at the second routing units 320 and routed to the second integrated circuits 340. The first touch sensing lines Tx_a and the first fingerprint sensing lines Tx_b are collected at the first routing units 330 and are routed to the first integrated circuits 350. The first routing units 330 may be arranged on a side of the touch pad 310, and the second routing units 320 may be arranged on the other side of the touch pad 310. For example, the first routing units 330 may be arranged on a first side of the touch pad 310 facing a first direction (for example, an x-axis direction) in which the first touch sensing lines Tx_a and the first fingerprint sensing lines Tx_b extend. The second routing units 320 may be arranged on a second side of the touch pad 310 facing a second direction (for example, a y-axis direction) in which the second touch sensing lines Rx_a and the second fingerprint sensing lines Rx_b extend. Many first routing units 330 may be formed. For example, a number of the first routing units 330 may be formed to equal the number of the fingerprint sensing regions pfr arranged along the second direction. Many second routing units 320 may be formed. For example, a number of the second routing units 320 may be formed to equal the number of the fingerprint sensing regions pfr arranged along the first direction. For example, the fingerprint sensing regions pfr may be arranged in an m×n matrix in which m number are arranged in the first direction and n number are arranged in the second direction. In this case, as many as m number of the second routing units 320 may be arranged, and as many as n number of the first routing units 330 may be arranged.

In the present exemplary embodiment, the first integrated circuits 350 may be a COF type integrated circuit directly arranged on the first routing units 330. In the present exemplary embodiment, the second integrated circuits 340 may be a COF type integrated circuit directly arranged on the second routing units 320. In this case, a plurality of the first integrated circuits 350 and the second integrated circuits 340 may be used, but there is an advantage in that the configuration of a PCB circuit (not shown) may be omitted.

Figure 4:
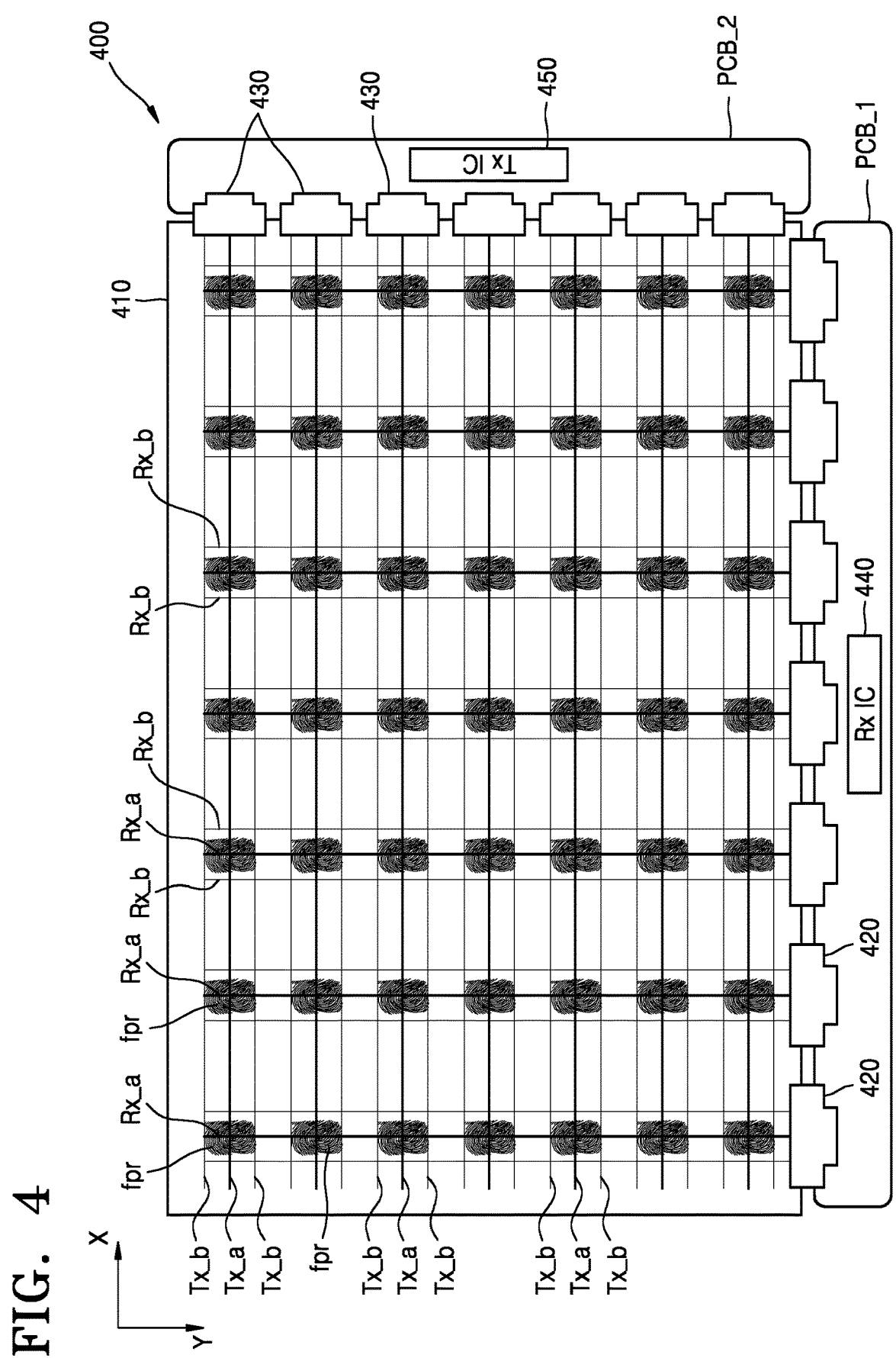
FIG. 4 is a schematic diagram of a fingerprint/touch sensor according to another exemplary embodiment.

FIG. 4 is a schematic diagram of a fingerprint/touch sensor 400 according to another exemplary embodiment. Referring to FIG. 4, the fingerprint/touch sensor 400 includes a touch pad 410, a plurality of first touch sensing lines Tx_a, a plurality of second touch sensing lines Rx_a, a plurality of first fingerprint sensing lines Tx_b, a plurality of second fingerprint sensing lines Rx_b, a plurality of first routing units 430, a plurality of second routing units 420, a Tx integrated circuit 450, and an Rx integrated circuit 440.

In the fingerprint/touch sensor 400 according to the present exemplary embodiment, fingerprint sensing regions pfr may be arranged in a matrix type. The second touch sensing lines Rx_a and the second fingerprint sensing lines Rx_b are collected at the second routing units 420 and are routed to the single Rx integrated circuit 440. The first touch sensing lines Tx_a and the first fingerprint sensing lines Tx_b are collected at the first routing units 430 and are routed to the single Tx integrated circuit 450. The first routing units 430 may be arranged on a side of the touch pad 410, and the second routing units 420 may be arranged on the other side of the touch pad 410. For example, the first routing units 430 and the second routing units 420 may include a FPCB. For example, the first routing units 430 may be arranged on a first side of the touch pad 410 facing a first direction (for example, an x-axis direction) in which the first touch sensing lines Tx_a and the first fingerprint sensing lines Tx_b extend. The second routing units 420 may be arranged on a second side of the touch pad 410 facing a second direction (for example, a y-axis direction) in which the second touch sensing lines Rx_a and the first fingerprint sensing lines Tx_b extend. Many of the first routing units 430 may be formed. For example, a number of the first routing units 430 may be formed to equal the number of the fingerprint sensing regions pfr arranged in the second direction. Many of the second routing units 420 may be formed. For example, a number of the second routing units 420 may be formed to equal the number of the fingerprint sensing regions pfr arranged in the first direction. For example, the fingerprint sensing regions pfr may be arranged in an m×n matrix in which m number are arranged in the first direction and n number are arranged in the second direction. In this case, as many as m number of the second routing units 420 may be arranged, and as many as n number of the first routing units 430 may be arranged.

In the present exemplary embodiment, the Tx integrated circuit 450 and the Rx integrated circuit 440 may be arranged on separate PCB circuits. For example, the Tx integrated circuit 450 may be arranged on a second PCB circuit PCB_2. For example, the Rx integrated circuit 440 may be arranged on a first PCB circuit PCB_1. In the fingerprint/touch sensor 400 according to the present exemplary embodiment, a fingerprint/touch sensor may be realized by including only two integrated circuits, that is, the Tx integrated circuit 450 and the Rx integrated circuit 440 that collect the fingerprint sensing regions pfr arranged in a matrix. Accordingly, the fingerprint/touch sensor 400 may be manufactured with a reduced cost as compared to a fingerprint/touch sensor configured of a plurality of integrated circuits. In the present exemplary embodiment, the first PCB circuit PCB_1 and the second PCB circuit PCB_2 are depicted as separated circuits, but the present exemplary embodiment is not limited thereto. The first PCB circuit PCB_1 and the second PCB circuit PCB_2 may be realized as a single body.

Figure 5:
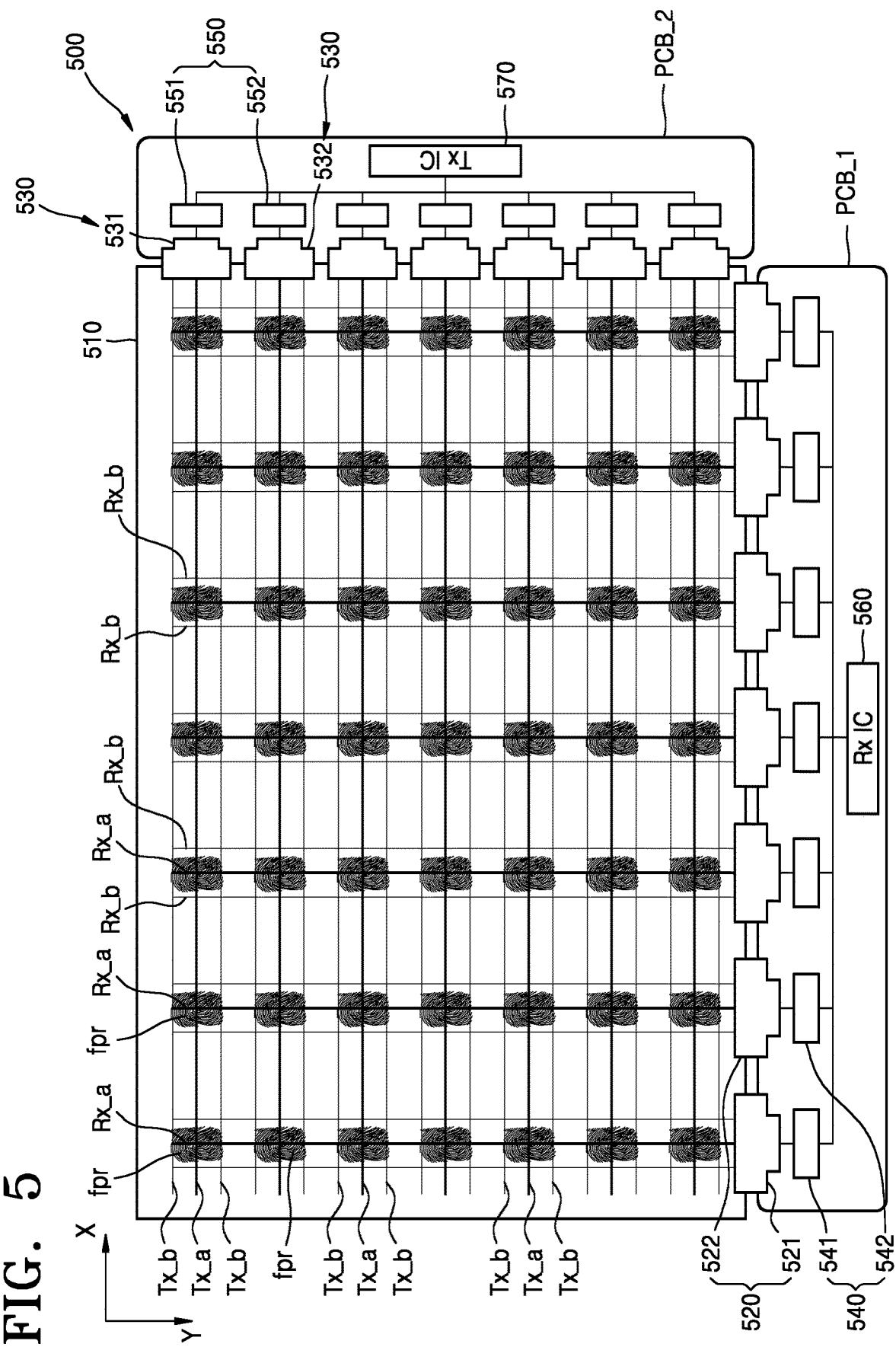
FIG. 5 is a schematic diagram of a fingerprint/touch sensor according to another exemplary embodiment.
Figure 6:
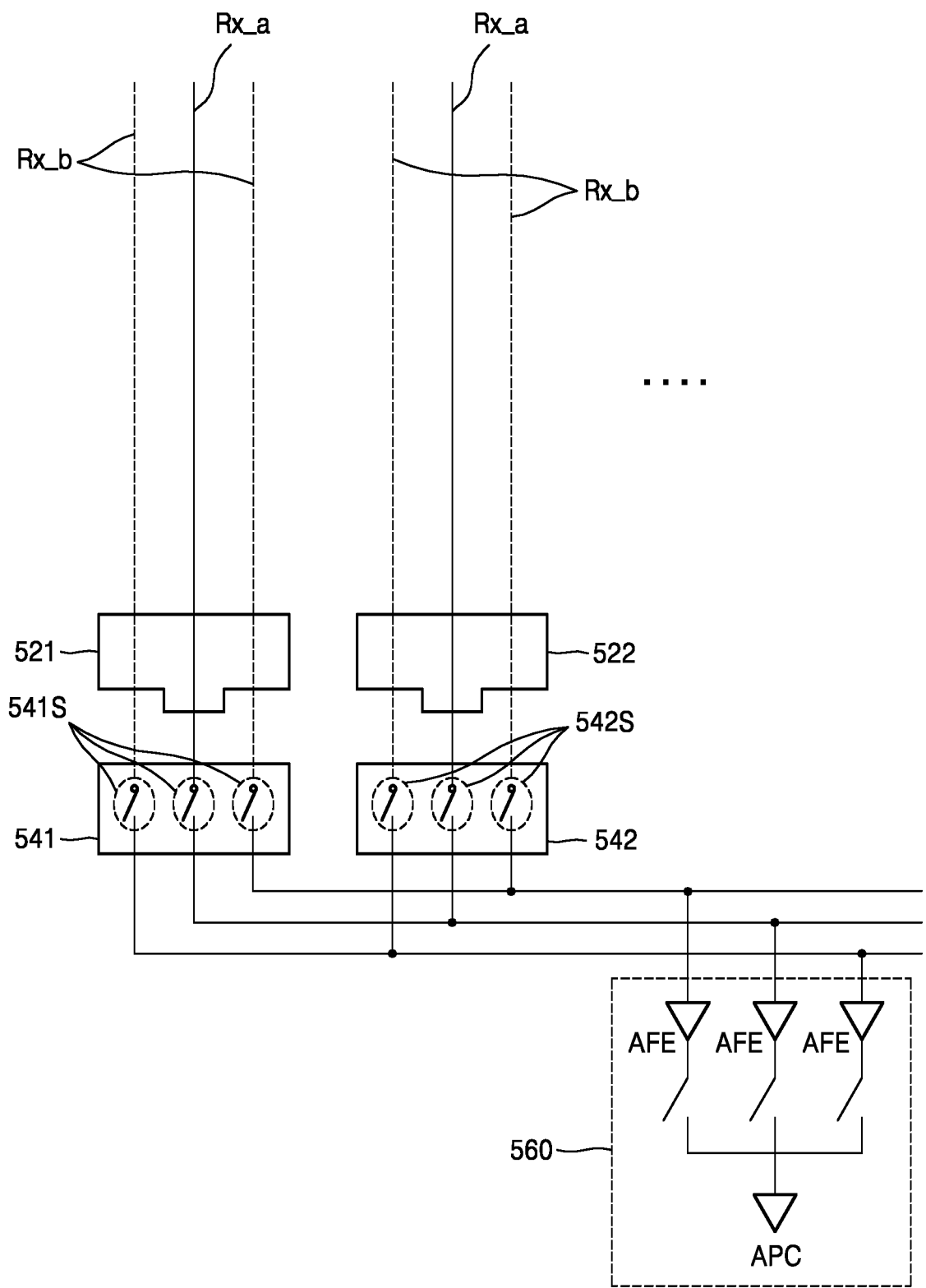
FIG. 6 is a schematic diagram of a switching device of the fingerprint/touch sensor of FIG. 5.

FIG. 5 is a schematic diagram of a fingerprint/touch sensor 500 according to another exemplary embodiment. FIG. 6 is a schematic diagram of a second switching device 540 of the fingerprint/touch sensor 500 of FIG. 5.

Referring to FIGS. 5 and 6, the fingerprint/touch sensor 500 includes a touch pad 510, a plurality of first touch sensing lines Tx_a, a plurality of second touch sensing lines Rx_a, a plurality of first fingerprint sensing lines Tx_b, a plurality of second fingerprint sensing lines Rx_b, a plurality of first routing units 530, a plurality of second routing units 520, a plurality of first switching devices 550, a plurality of second switching devices 540, a Tx integrated circuit 570, and an Rx integrated circuit 560. When the fingerprint/touch sensor 500 according to the present exemplary embodiment is compared with the fingerprint/touch sensor 400 of FIG. 4, the fingerprint/touch sensor 500 is substantially identical to the fingerprint/touch sensor 400 except for configurations of the first switching devices 550 and the second switching devices 540, and thus, the descriptions thereof will not be repeated.

The first switching devices 550 may increase sensing resolution by separating signals of Tx sensing lines transmitted through the first routing units 530. Each of the first switching devices 550 may include a plurality of first sub-switches (not shown) that respectively correspond to the first touch sensing lines Tx_a and the first fingerprint sensing lines Tx_b. The first sub-switches (not shown) may individually control the signal-receiving of the respective corresponding Tx sensing lines. At this time, the Tx integrated circuit 570 according to the present exemplary embodiment may include sub-switches respectively corresponding to the first sub-switches. For example, the sub-switches may be arranged between an analog front end (AFE) and an automatic phase control (ADC) device. A configuration related to the sub-switch will be described with reference to FIG. 6.

Referring to FIG. 6, the second switching devices 540 may increase sensing resolution by separating signals of the second touch sensing lines Rx_a and the second fingerprint sensing lines Rx_b transmitted through the second routing units 520. Each of the second switching devices 540 may include a plurality of second sub-switches 541s and 542s that correspond one to one to the Rx sensing lines Rx_a and Rx_b. The second sub-switches 541s and 542s may individually control the signal-receiving of the respective corresponding Rx sensing lines Rx_a and Rx_b. The Rx integrated circuit 560 according to the present exemplary embodiment may include sub-switches respectively corresponding to the second sub-switches. The sub-switches may be arranged between an AFE and an ADC device.

In the present exemplary embodiment, the first touch sensing lines Tx_a and the first fingerprint sensing lines Tx_b extend in a first direction, and the second touch sensing lines Rx_a and the second fingerprint sensing lines Rx_b extend in a second direction. The fingerprint sensing regions according to the present exemplary embodiment may be arranged in an m×n matrix in which m number are arranged in the first direction and n number are arranged in the second direction. In this case, as many as m number of the second routing units 520 may be arranged, and as many as n number of the first routing units 530 may be arranged.

Referring to FIGS. 5 and 6, the fingerprint sensing regions pfr and the touch sensing regions that are arranged on the same column may be sensed through a corresponding unit of the second routing units 520. Referring to FIG. 5, the fingerprint sensing regions pfr and the touch sensing regions located on a first column of the matrix are sensed by second routing units 521 and the fingerprint sensing regions pfr and the touch sensing regions located on a second column are sensed by second routing units 522.

Assuming that sensing light is simultaneously performed in the fingerprint sensing regions located on the first column and the fingerprint sensing regions located on the second column of the matrix, in this case, the second routing units 521 and the second routing units 522 simultaneously transmit fingerprint-sensing signals that are respectively sensed to the Rx integrated circuit 560. Accordingly, the Rx integrated circuit 560 may not clearly distinguish whether the sensed signal is transmitted from the second routing units 521 or the second routing units 522, and accordingly, resolution of the sensing may be reduced.

In order to prevent this problem, the fingerprint/touch sensor 500 according to the present embodiment may include a plurality of second switching devices 540 respectively corresponding to the second routing units 520. For example, the second routing units 521 may correspond to second switching devices 541, and the second routing units 522 may correspond to second switching devices 542. In this case, so as to not simultaneously generate signals from the fingerprint sensing regions located in the first column and the fingerprint sensing regions located in the second column, the second switching devices 542 may be in an OFF state when the second switching devices 541 are in an ON state. Accordingly, through the introduction of the second switching devices 540, only a single Rx integrated circuit 560 may sense signals of the fingerprint sensing regions and the touch sensing regions corresponding to a plurality of columns while maintaining resolution. That is, so as not to simultaneously generate signals from the second routing units 520 corresponding to each of the rows, when one of the second routing units 520 is in an ON state, the remaining second routing units 520 may be in an OFF state. The transition of ON-OFF state is realized by the second switching devices 540.

Likewise, the fingerprint sensing regions pfr and the touch sensing regions that are arranged on the same row may be sensed through a corresponding unit of the first routing units 530. For example, the fingerprint sensing regions pfr and the touch sensing regions located in a first row of a matrix are sensed by first routing units 531, and the fingerprint sensing regions pfr and the touch sensing regions located in a second row are sensed by first routing units 532. As described above, in order to clearly distinguish the signals, the first routing units 531 may correspond to first switching devices 551, and the second routing units 532 may correspond to first switching devices 552. In order for the first routing units 530 corresponding to each of the rows to not simultaneously generate signals, when one of the first routing units 530 is on an ON state, the remaining first routing units 530 may be in an OFF state.

In the present exemplary embodiment, the Tx integrated circuit 570 and the Rx integrated circuit 560 may be arranged on separate PCB circuits. For example, the Tx integrated circuit 570 may be arranged on a second PCB circuit PCB_2. For example, the Rx integrated circuit 560 may be arranged on a first PCB circuit PCB_1. In the fingerprint/touch sensor 500 according to the present exemplary embodiment, a fingerprint/touch sensor may be realized by including the fingerprint sensing regions pfr that are arranged in a matrix type by using only two integrated circuits, and thus, a manufacturing cost of the fingerprint/touch sensor 500 may be reduced. In the present exemplary embodiment, it is depicted that the first PCB circuit PCB_1 and the second PCB circuit PCB_2 are separate circuits, but the present exemplary embodiment is not limited thereto, that is, the first PCB circuit PCB_1 and the second PCB circuit PCB_2 may be realized as a single body.

An electronic apparatus according to an exemplary embodiment may include a fingerprint/touch sensor according to the exemplary embodiments described above. The fingerprint/touch sensor according to the exemplary embodiments described above may have a good appearance since fingerprint sensing regions and touch sensing regions are realized in a single touch pad. Also, the electronic apparatus may be operated with small number of integrated circuits, and thus, an operation cost and power cost may be reduced. Examples of the electronic device are personal computers, notebook computers, navigations, smartphones, portable digital players (PDPs), cameras, tablet personal computers (PCs), personal digital assistants (PDAs), portable multimedia players (PMPs), or gamers. These are only examples, and thus, the fingerprint/touch sensor may be applied to other electronic devices as long as it does not depart from the inventive concept.

While exemplary embodiments of fingerprint/touch sensors and electronic devices including the fingerprint/touch sensor have been described in detail with reference to accompanying drawings, in which exemplary embodiments are shown. However, it should be understood that exemplary embodiments described herein should be considered in a descriptive sense only and not for purposes of limitation. Also, it should be understood that the inventive concept is not limited to the embodiments described above because various changes in form and details may be made by those of ordinary skill in the art.

What is claimed is:

1. A fingerprint/touch sensor comprising:
   a touch pad;
   a touch sensing element forming a touch region on the touch pad, wherein the touch sensing element comprises: a plurality of first touch sensing lines extending in a row direction and a plurality of second touch sensing lines extending in a column direction, different from the row direction;
   a fingerprint sensing element forming a fingerprint sensing region on the touch pad, therein the fingerprint sensing element comprises: a plurality of first fingerprint sensing lines extending in the row direction and a plurality of second fingerprint sensing lines extending in the column direction;
   a routing unit configured to route a signal generated by the touch sensing element and a signal generated by the fingerprint sensing element, wherein the routing unit comprises routing units, located at a side of the touch pad, wherein the routing units are configured to route the plurality of first touch sensing lines, the plurality of second touch sensing lines, the plurality of first fingerprint sensing lines, and the plurality of second fingerprint sensing lines;
   an integrated circuit configured to sense a touch of the touch pad by processing the signal generated by the touch sensing element and routed by the routing unit and configured to sense a fingerprint by processing the signal generated by the fingerprint sensing element and routed by the routing unit; and a switching device connected between the routing unit and the integrated circuit and configured to switch a connection between the routing unit and the integrated circuit, the switching device comprising a plurality of switching devices that respectively correspond to the routing units, wherein the switching device controls such that, when a first switching device of the plurality of switching devices corresponding to one of the routing units is turned on, a second switching device that neighbors the first switching device is turned off, and wherein the fingerprint sensing region overlaps at least a portion of the touch region.

2. The fingerprint/touch sensor of claim 1, wherein the fingerprint sensing element is located within the touch region.

3. The fingerprint/touch sensor of claim 2, wherein the integrated circuit is a combined integrated circuit configured to process both the signal generated by the touch sensing element and the signal generated by the fingerprint sensing element.

4. The fingerprint/touch sensor of claim 1, wherein the integrated circuit is a chip on film (COF) located directly on the routing units.

5. The fingerprint/touch sensor of claim 1, further comprising a printed circuit board (PCB), wherein the integrated circuit is located on the PCB.

6. The fingerprint/touch sensor of claim 1, wherein the fingerprint sensing element forms a plurality of fingerprint sensing regions arranged in a matrix.

7. The fingerprint/touch sensor of claim 1, wherein the routing unit comprises first routing units and second routing units, the first routing units being located at a first side of the touch pad and the second routing units being located at a second side of the touch pad, wherein the first routing units are configured to route the plurality of first touch sensing lines and the plurality of first fingerprint sensing lines to the integrated circuit, and the second routing units are configured to route the plurality of second touch sensing lines and the plurality of second fingerprint sensing lines to the integrated circuit.

8. The fingerprint/touch sensor of claim 7, wherein the integrated circuit comprises a first integrated circuit and a second integrated circuit, wherein the first routing units are configured to route the plurality of first touch sensing lines and the plurality of first fingerprint sensing lines to the first integrated circuit, and the second routing units are configured to route the plurality of second touch sensing lines and the plurality of second fingerprint sensing lines to the second integrated circuit.

9. The fingerprint/touch sensor of claim 8, wherein the first integrated circuit is a chip on film (COF) disposed on the first routing units, and the second integrated circuit is a COF disposed on the second routing units.

10. The fingerprint/touch sensor of claim 8, further comprising a printed circuit board (PCB) on which the integrated circuit is located.

11. The fingerprint/touch sensor of claim 10, wherein the PCB comprises a first PCB on which the first integrated circuit is located and a second PCB on which the second integrated circuit is located.

12. The fingerprint/touch sensor of claim 8, wherein each of the first integrated circuit and the second integrated circuit is a combined integrated circuit configured to process both the signal generated by the touch sensing element and the signal generated by the fingerprint sensing element.

13. The fingerprint/touch sensor of claim 8, further comprising:

a plurality of first switching devices connected between the first routing units and the first integrated circuit, wherein the plurality of first switching devices are configured to switch connections between the first routing units and the first integrated circuit; and a plurality of second switching devices connected between the second routing units and the second integrated circuit, wherein the plurality of second switching devices are configured to switch connections between the second routing units and the second integrated circuit.

14. An electronic device comprising the fingerprint/touch sensor of claim 1.

15. The fingerprint/touch sensor of claim 1, wherein the switching device comprises a plurality of first sub-switches that correspond, one to one, to the plurality of first touch sensing lines and the plurality of first fingerprint sensing lines, and a plurality of second sub-switches that correspond, one to one, to the plurality of second touch sensing lines and the plurality of second fingerprint sensing lines.

* * * * *